Aug. 2, 1932.  C. S. HADDLESAY  1,869,893
CAR FOR MONORAIL SYSTEMS
Filed Feb. 25, 1931   2 Sheets-Sheet 1

Inventor
Charles S. Haddlesay
By Jones Addington Ames & Seibold
Attys.

Aug. 2, 1932.  C. S. HADDLESAY  1,869,893
CAR FOR MONORAIL SYSTEMS
Filed Feb. 25, 1931    2 Sheets-Sheet 2

Inventor:
Charles S. Haddlesay
By Jones Addington Ames & Seibold
Attys.

Patented Aug. 2, 1932

1,869,893

UNITED STATES PATENT OFFICE

CHARLES S. HADDLESAY, OF ELMHURST, ILLINOIS

CAR FOR MONORAIL SYSTEMS

Application filed February 25, 1931. Serial No. 518,186.

This invention relates to cars or trolleys for monorail conveyor systems where the load is suspended below the track and where the cars or trolleys travel in a slot in the underside of the track.

One of the objects of this invention is to provide a car to travel around curves and along straight track with a small amount of friction.

A further object is to provide a car which can swing with a pendulum action in the plane of travel with a yoke that will not rub or bind on track.

A further object is to provide suitable, substantial locked ball bearing races.

Further objects of the invention will be apparent from the description and claims.

In the drawings in which an embodiment of my invention is shown,

Figure 1:
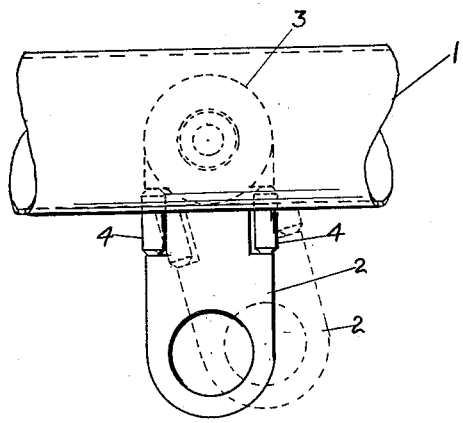
Figure 1 shows a side elevation of a car in a tubular track.
Figure 2:
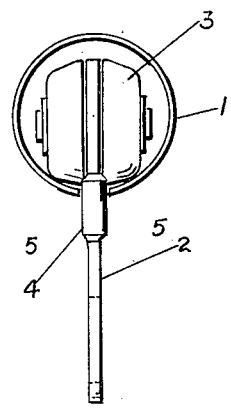
Fig. 2 shows the track in section with the car in elevation.
Figure 3:
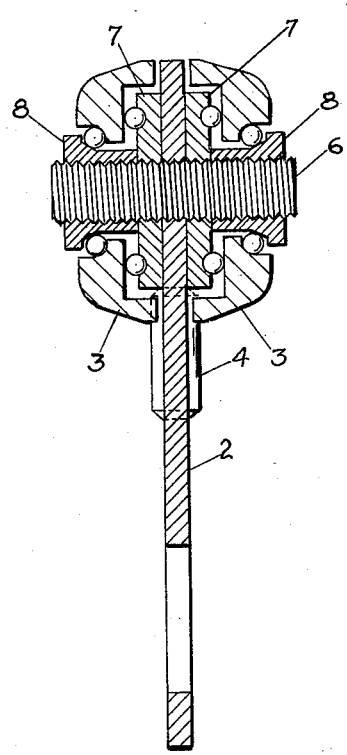
Fig. 3 is an axial vertical section of the car.
Figure 4:
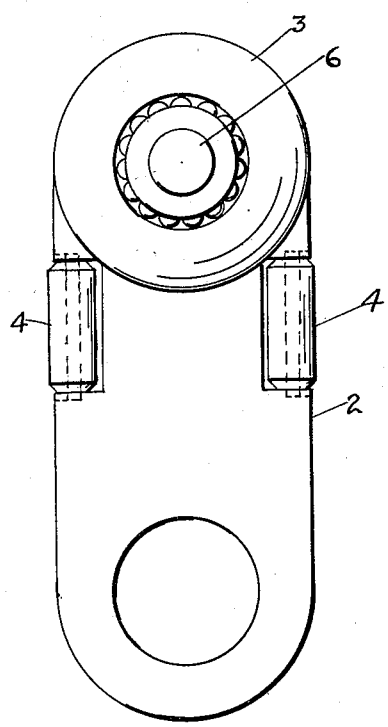
Fig. 4 is a side elevation of the car.

Referring to the drawings in detail, and first to Figs. 1 to 4 inclusive, the construction shown comprises a tubular track 1 having a longitudinal slot on its lower side through which the suspension member 2 of the car extends downwardly and a car comprising the aforesaid suspension member 2 and a pair of rollers 3 rotatably secured to the suspension member for independent rotation relative to each other, whereby the car can travel around curves without necessitating slippage of either wheel. The suspension member is further provided with a pair of anti-friction rollers 4 for taking care of lateral pressure by engagement with the edges 5 of the slot in the tubing. As shown in Fig. 1, this construction provides for free swinging of the suspension member in the plane of its travel as between the full-line position and the dotted-line position shown, thus permitting for an inclination of the track as well as preventing jerky motion of the load.

Anti-friction means are provided for each of the load-supporting rollers comprising a pair of ball bearings one on each side of the suspension member and mounted on a threaded mounting pin 6 extending through the suspension member. Each ball bearing comprises a thrust ball race member 7 threaded on the mounting pin and clampingly engaging the suspension member 2, and a second ball race member 8 also threaded on the mounting pin and acting as a lock nut for the first ball race member, this second ball race member having provisions both for radial pressure and end thrust, the load-supporting roller 3 being thus held in proper position because of its relation to the two ball race members.

Figures 5, 6:
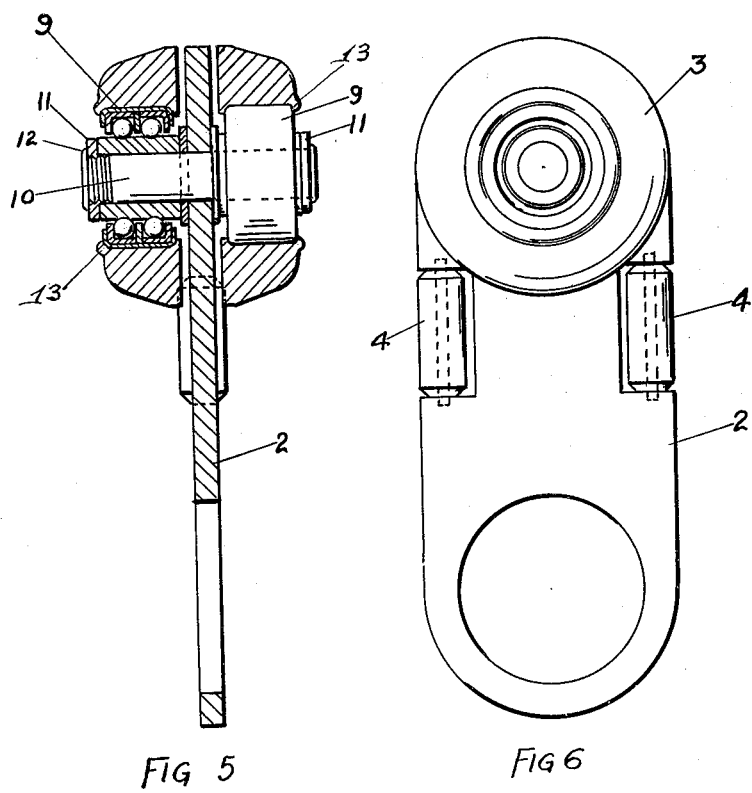
Fig. 5 is an axial vertical section of a different form of car.
Fig. 6 is a side elevation of the car of Fig. 5.

The construction of Figs. 5 and 6 is substantially the same as that just described except as to the ball bearings and mounting therefor. In this form two ball bearings 9 are provided, one on each side of the suspension member, each being slipped over the mounting pin 10 and held in place by means of a retaining nut 11, the end of the mounting pin being riveted over this nut, as at 12, if desired, to hold it firmly in position. In this form the ball bearing is of the type designed to take care both of the radial pressure and of the slight end thrust to which the construction may be subjected.

In this form the anti-friction roller may have its side edges swaged over the outer ball race member, as indicated at 13, to secure the roller permanently to the ball race member.

While I have shown but two embodiments of my invention, it will be apparent to those skilled in the art that various modifications thereof may be made without departing from the spirit and scope of this invention, and, therefore, I wish to be limited only by the prior art and the scope of the appended claims.

I claim:

1. A monorail car from which the load is suspended having two wheels, one on each side of a yoke, said two wheels being on a common axis with said axis threaded into the yoke and locked with inner ball bearing races on either side of the yoke.

2. A monorail car from which the load is suspended having two wheels, one on each side of a yoke, said two wheels being on a common axis with said axis threaded into the yoke and locked with inner ball bearing races on either side of the yoke, said inner races in turn being locked by two outer ball bearing races on either side.

3. A monorail car comprising a suspension member and a pair of rollers secured to said suspension member on opposite sides thereof for independent rotation with respect to each other, whereby the car can travel around curves without necessitating slippage of either wheel, and means for mounting said rollers on said suspension member comprising a mounting pin extending through said suspension member and laterally on both sides thereof and a pair of ball bearings for said rollers respectively mounted on said mounting pin on opposite sides of said suspension member, each ball bearing comprising a ball race member threaded on said mounting pin.

4. A monorail car comprising a suspension member and a pair of rollers secured to said suspension member on opposite sides thereof for independent rotation with respect to each other, whereby the car can travel around curves without necessitating slippage of either wheel, and means for mounting said rollers on said suspension member comprising a mounting pin extending through said suspension member and laterally on both sides thereof and a pair of ball bearings for said rollers respectively mounted on said mounting pin on opposite sides of said suspension member, each ball bearing comprising a ball race member threaded on said mounting pin, and a second ball race member also threaded on said mounting pin and serving as a lock nut for said first ball race member.

5. A monorail car comprising a suspension member and a pair of rollers secured to said suspension member on opposite sides thereof for independent rotation with respect to each other, whereby the car can travel around curves without necessitating slippage of either wheel, and means for mounting said rollers on said suspension member comprising a mounting pin extending through said suspension member and laterally on both sides thereof and a pair of ball bearings for said rollers respectively mounted on said mounting pin on opposite sides of said suspension member, each ball bearing comprising a race member surrounding said mounting pin and a member threaded on said mounting pin for holding said ball race member in place.

In witness whereof, I have hereunto subscribed by name.

CHARLES S. HADDLESAY.